US010511380B2

(12) United States Patent
Ching et al.

(10) Patent No.: US 10,511,380 B2
(45) Date of Patent: Dec. 17, 2019

(54) SYSTEM AND METHOD FOR EFFICIENT WIDEBAND CODE DIVISION MULTIPLEXING IN SUBBAND DOMAIN

(71) Applicant: RAYTHEON COMPANY, Waltham, MA (US)

(72) Inventors: Jason A. Ching, Irvine, CA (US); Hao O. Phung, Alhambra, CA (US); Yueh-Shan Chang, Westlake Village, CA (US)

(73) Assignee: RAYTHEON COMPANY, Waltham, MA (US)

(*) Notice: Subject to any disclaimer, the term of this patent is extended or adjusted under 35 U.S.C. 154(b) by 37 days.

(21) Appl. No.: 15/848,869

(22) Filed: Dec. 20, 2017

(65) Prior Publication Data

US 2019/0190595 A1 Jun. 20, 2019

(51) Int. Cl.
*H04B 7/26* (2006.01)
*H04B 7/06* (2006.01)
*H04J 13/00* (2011.01)

(52) U.S. Cl.
CPC ......... *H04B 7/2628* (2013.01); *H04B 7/0617* (2013.01); *H04J 13/0003* (2013.01); *H04J 13/0048* (2013.01)

(58) Field of Classification Search
CPC .................. H04B 1/707; H04B 7/2628; H04B 2201/70701; H04B 1/7075; H04J 13/00
USPC ...................................................... 370/342
See application file for complete search history.

(56) References Cited

U.S. PATENT DOCUMENTS

| 5,422,647 | A | 6/1995 | Hirshfield et al. |
| 5,856,804 | A * | 1/1999 | Turcotte ............... G01S 3/42 342/371 |
| 8,218,476 | B2 | 7/2012 | Miller |
| 2001/0030940 | A1* | 10/2001 | Hellberg ............... H04L 5/06 370/210 |
| 2003/0076899 | A1* | 4/2003 | Kumar ................... H04L 5/06 375/316 |

(Continued)

OTHER PUBLICATIONS

Elias A. Alwan, et al., Code Optimization for a Code-Modulated RF Front End, Apr. 15, 2015, Ohio State University, Columbus, OH.*

(Continued)

*Primary Examiner* — Gbemileke J Onamuti
*Assistant Examiner* — Sanjay K Dewan
(74) *Attorney, Agent, or Firm* — Lewis Roca Rothgerber Christie LLP

(57) ABSTRACT

System and method for efficient wideband code division multiplexing in subband domain include: aggregating L analog signals received from L antenna elements into a single aggregated signal, by using code division multiplexing with L code words, where L is an integer greater than 1; converting the single aggregated analog signal to a single aggregated digital signal, by a single analog-to-digital converter (ADC); channelizing the single aggregated digital signal into N subbands, where N is an integer greater than 1; performing circular convolutions of the N subbands with the L code words to demultiplex the channelized signal into L elements per subband; and routing each subband signal of the L elements to N beamforming circuits for performing beamforming on each of the N subbands.

20 Claims, 6 Drawing Sheets

(56) References Cited

U.S. PATENT DOCUMENTS

2014/0286236 A9   9/2014  Miller et al.
2014/0327576 A1   11/2014 Kumar

OTHER PUBLICATIONS

Elias A. Alwan, et al., "Code Optimization for a Code-Modulated RF Front End," IEEE Access, vol. 3, Apr. 15, 2015 (pp. 260-273).
Roufarshbaf, et al., "Analog Multiband: Efficient Bandwidth Scaling for mm-Wave Communication", IEEE Journal of Selected Topics in Signal Processing, IEEE, US, vol. 10, No. 3, Apr. 1, 2016 (pp. 470-484).
Song, et al., "One Trillion Operations per Second On-Board VLSI Signal Processor for Discoverer II Space Based Radar", Aerospace Conference Proceedings, 2000 IEEE Mar. 18-25, 2000, vol. 5, Mar. 18, 2000 (pp. 213-218).
International Search Report for corresponding International Application No. PCT/US2018/058695, filed Nov. 1, 2018, International Search Report dated Mar. 6, 2019 and dated Mar. 15, 2019 (5 pgs.).
Written Opinion of the International Searching Authority for corresponding International Application No. PCT/US2018/058695, filed Nov. 1, 2018, Written Opinion of the International Searching Authority dated Mar. 15, 2019 (7 pgs.).

\* cited by examiner

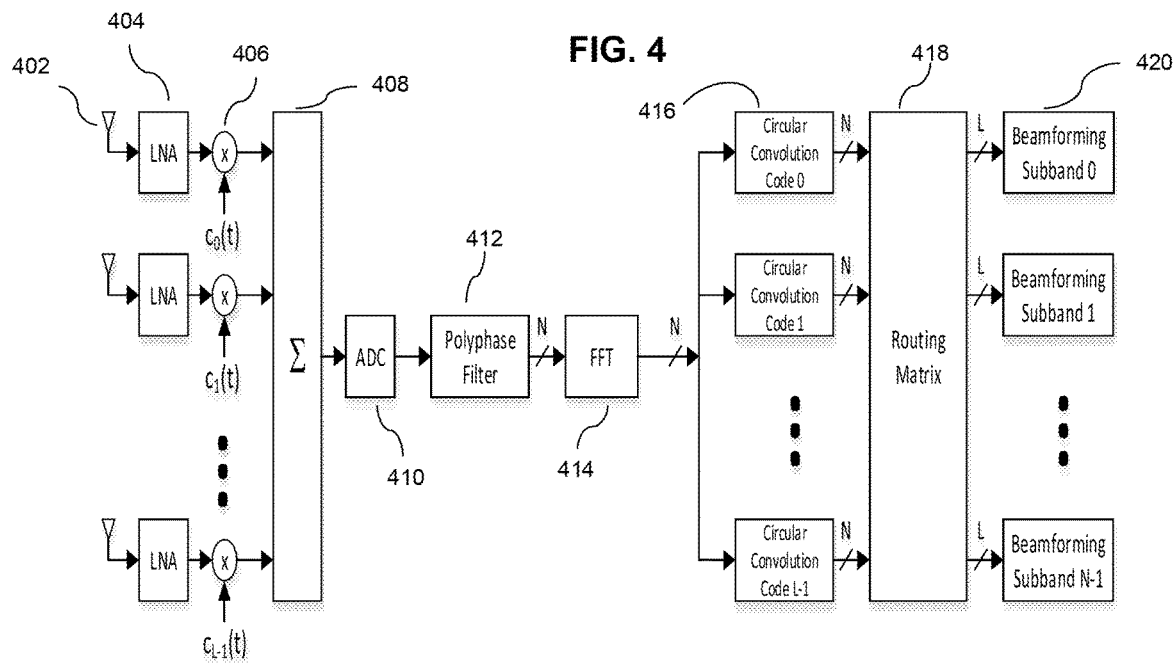
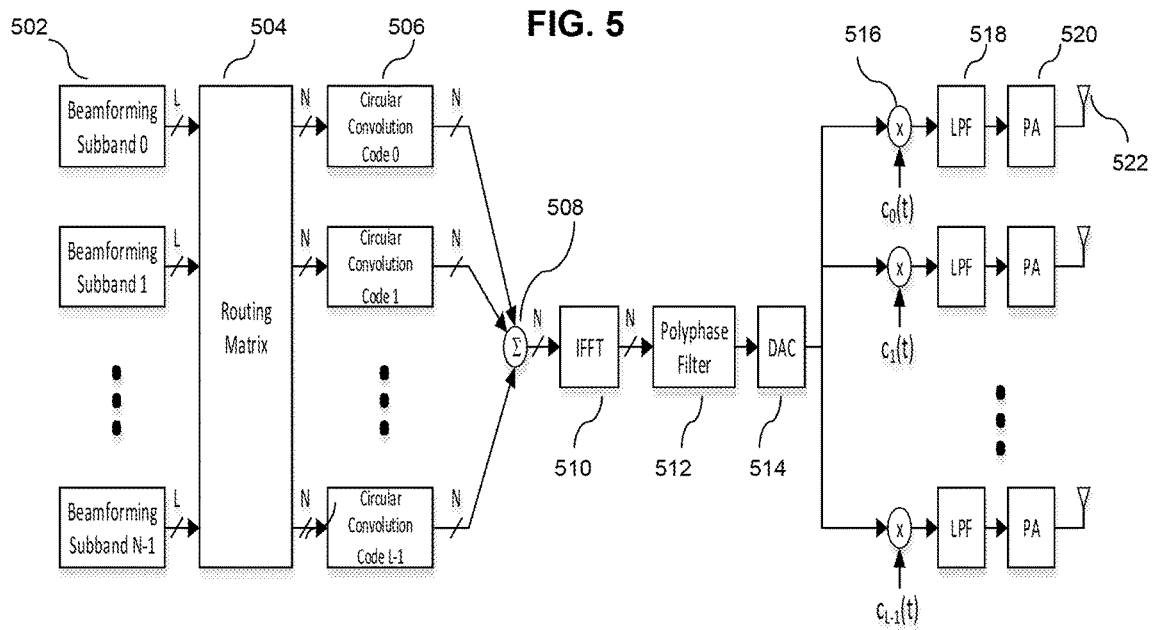

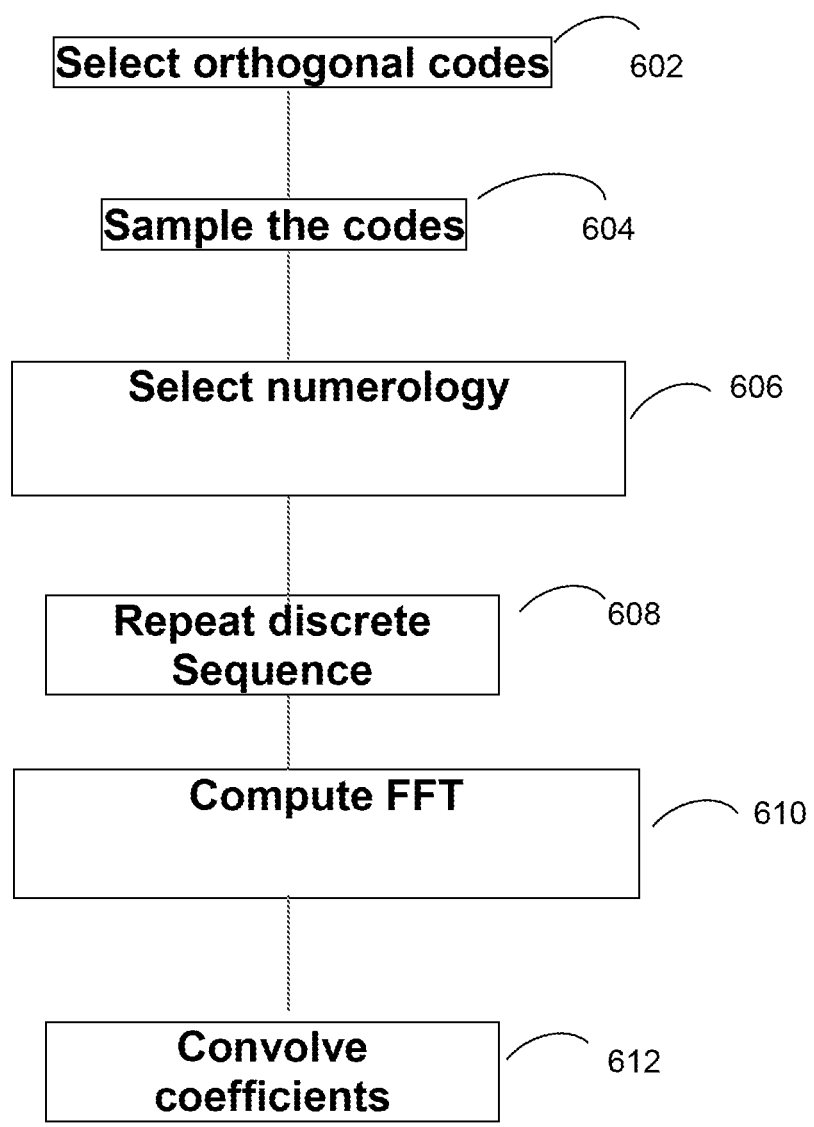

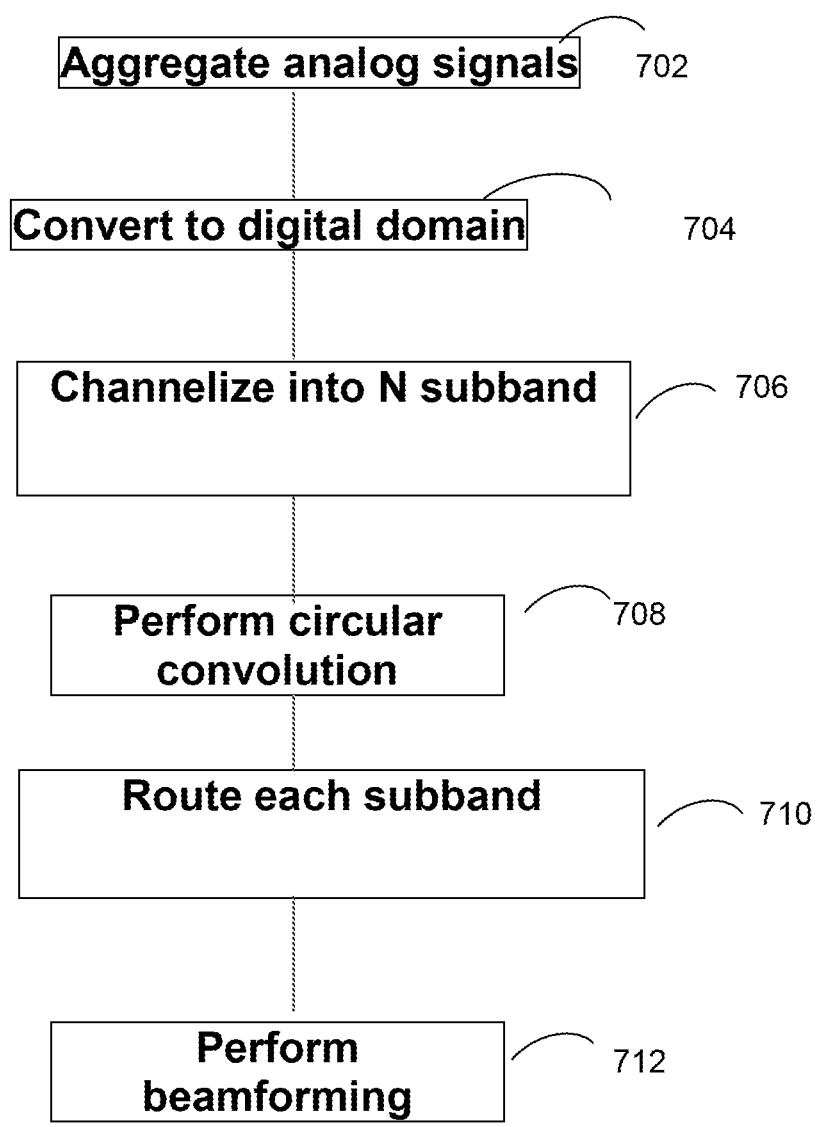

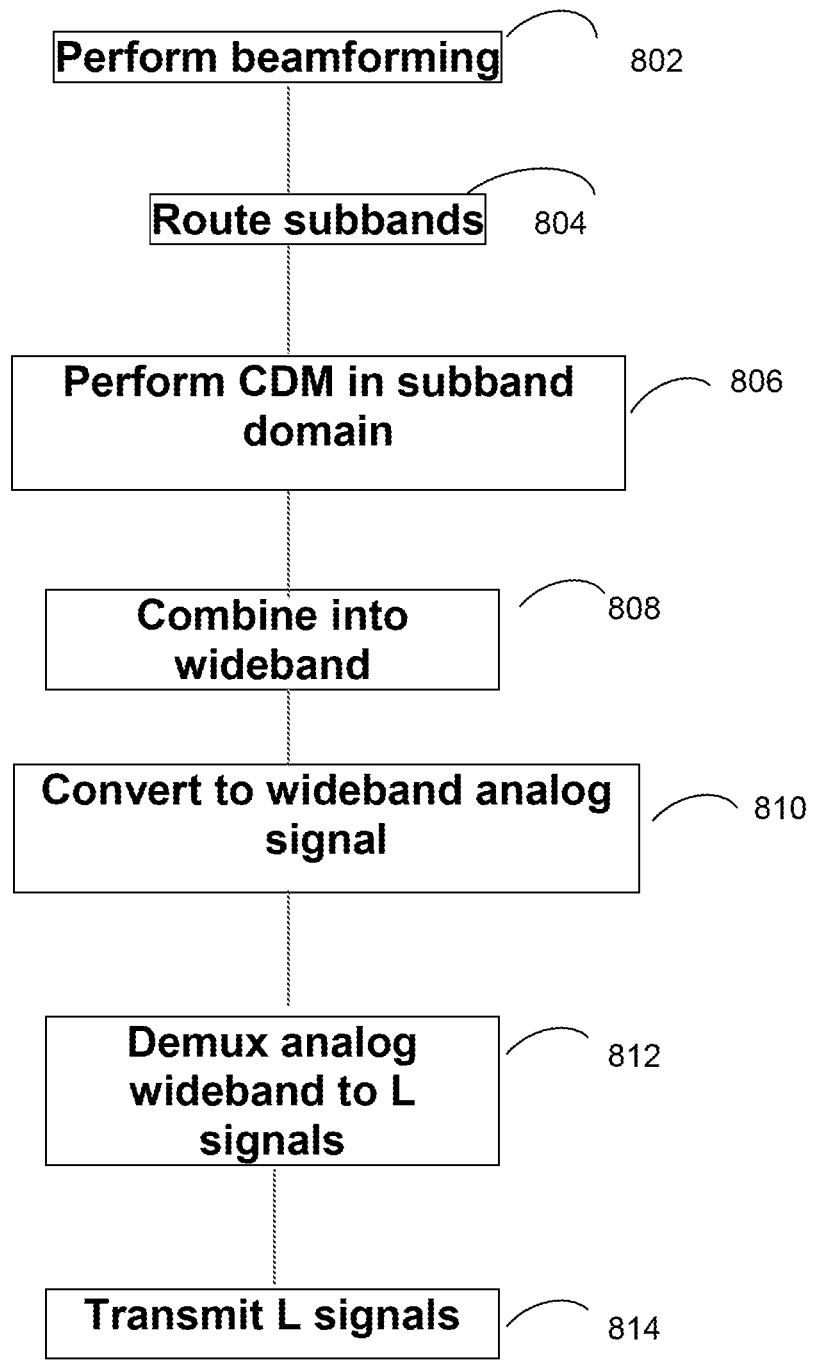

SYSTEM AND METHOD FOR EFFICIENT WIDEBAND CODE DIVISION MULTIPLEXING IN SUBBAND DOMAIN

FIELD OF THE INVENTION

The present invention relates generally to digital beamforming and more specifically to efficient wideband code division multiplexing in subband domain.

BACKGROUND

An antenna array is a group of multiple active antennas coupled to a common source or load to produce a directive radiation pattern. Usually, the spatial relationship of the individual antennas also contributes to the directivity of the antenna array. A phased array antenna is an array of antennas in which the relative phases of the signals feeding the antennas are varied in a manner that the effective radiation pattern of the entire array is reinforced in a desired direction and suppressed in undesired directions.

FIG. 1 shows a diagram of a known antenna array 100. The antenna array 100 includes several linear arrays 104 housed in a (non-metallic) radome 102. Here, each linear array 104 is arranged vertically with spacing between each other, which is determined by the desired resonant frequency of the antenna array 100. Each linear array 104 is connected to an associated radio frequency (RF) electronics circuit contained in an external RF electronics module 108, via an antenna feed 106. The RF electronics module 108 is connected to external systems via a connection 110 for power, control, and communications connections; and may be physically mounted on the radome 102, or may be located remotely or outside of the antenna array 100. Typically, the received electrical signal from each antenna element is digitized by a dedicated analog-to-digital converter (ADC) or the received electrical signals from multiple antenna elements are weighted and summed in analog domain prior to digitization by an ADC.

Digital beamforming is a signal processing technique used in sensor and communications applications for directional signal transmission or reception. Digital beamforming is attained by combining elements in a phased array in such a way that signals at particular angles of arrival experience constructive coherent combining, while other signals experience destructive non-coherent combining. Digital beamforming can be used at both the transmitting and receiving ends in order to achieve spatial selectivity. An advantage of digital beamforming is the ability to simultaneously form multiple transmit or receive beams with different weighting/shaping and leverage other signal processing techniques that can be performed in the digital domain Modern communications and sensor (e.g., radar) payloads are constantly pushing more complexity into the digital domain. Examples of complex processing in the digital domain include channelization, wideband beamforming, frequency hopping, space-time adaptive processing (STAP), and regenerative processing. Communication systems increasingly utilize large numbers of highly directive narrow spot beams with dynamic steering to increase aggregate system throughput. Radar or sensor systems utilize narrow beams to increase angular resolution in imaging and detection applications. Such systems require a large number of antenna elements for an array-based antenna. Digital domain processing requires the input signal of each antenna element to be digitized with a dedicated ADC on the receive side and converted to analog domain with a dedicated digital-to-analog converter (DAC) on the transmit side.

Furthermore, future payloads will use direct RF sampling to enable high-performance flexible processing, requiring converters to operate at very high sampling rates. Next generation digital payloads will therefore contain many high-rate ADCs and DACs which translates to high power consumption and the associated size and weight challenges. The resulting increase in size, weight and power (SWaP) makes it prohibitive to have a high-speed converter dedicated to each antenna element.

Prior attempts at digital beamforming utilize either lower rate converters (e.g., ADC) or sub-array digital processing where signals at the antenna elements are weighted and summed in analog domain, prior to digitization. Using low rate converters results in decreased flexibility in terms of supported frequency and bandwidth requirements, while sub-array digital processing restricts the scan range and reduces the beam performance in both directivity and steerability.

Code division multiplexing (CDM) can be used to reduce the number of ADCs while maintaining the ability to digitize each antenna element for digital beamforming. FIG. 2 shows a block diagram of a conventional receiver with CDM. As known in the art, code division multiple access (CDMA) is an example of multiple access, where several transmitters can send information or several receiver can receive information simultaneously over a single communication channel. This allows several users to share the same spectral frequency bands. To prevent interference between the users, CDMA typically employs spread spectrum technology and a special coding scheme where each transmitter is assigned a unique code. In this application, CDM is used to multiplex signals from multiple antenna elements where each element is assigned a unique code. Referring now to FIG. 2, signals received on L antenna elements $202_0$-$202_L$ are amplified by, for example L low noise amplifiers (LNA) $204_0$-$204_{L-1}$ and coded by L mixers $206_0$-$206_{L-1}$ using unique codes for code division multiplexing $208_0$-$208_{L-1}$, before being summed (combined) by a summer 210 and then digitized by an ADC 212, where L is the number of antenna elements, which is also equal to the number of unique codes.

The output of the ADC 212 is then demultiplexed using L code correlators $214_0$-$214_L$ in time domain. Each demultiplexed signal is then channelized into N subbands using a polyphase filter bank $216_0$-$216_{L-1}$ and L fast Fourier transform (FFT) circuits $218_0$-$218_{L-1}$, where L and N are integers greater than 1. A routing matrix 220 routes the L channelized signals to N beamforming circuits $222_0$-$222_{N-1}$. Either partial or full beamforming is performed using L elements for each subband by the N beamforming circuits $222_0$-$222_{N-1}$. In this conventional receiver, beamforming is performed at the subband level to mitigate wideband dispersion.

As shown, conventional approaches typically demultiplex each element immediately after the ADC. However, this requires an independent processing path for each antenna element, which results in significant cost in required hardware resources. As described above, in the application of Direct Sequence Spread Spectrum Code Division Multiple Access (DSSS-CDMA), one will apply a code in time domain to demultiplex a signal. As described earlier, demultiplexing early in the processing chain can lead to significantly higher complexity from a hardware standpoint.

FIG. 3 is an exemplary block diagram of a conventional transmitter with CDM. As depicted, either partial or full beamforming is performed using L elements for each subband by the N beamforming circuits $302_0$-$302_{N-1}$. Beamforming is performed at the subband level to mitigate wideband dispersion. A routing matrix 304 routes N subband signals to L inverse fast Fourier transform (FFT) circuits $306_0$-$306_{L-1}$. For each of the L elements, subbands are recombined into a wideband signal using IFFT circuits $306_0$-$306_{L-1}$ and a polyphase filter bank $308_0$-$308_{L-1}$. The recombined wideband signal from each of the L elements is coded with a unique code ($c_0(n)$-$c_{L-1}(n)$), using a multiplier circuit $310_0$-$310_{L-1}$ and then aggregated by a summer 312 in time domain to form a combined signal, before being converted to analog signal by a DAC 314. The aggregated signals are then demultiplexed using code correlator $316_0$-$316_{L-1}$, before being sent to respective element RF chain, including low pass filters $318_0$-$318_{L-1}$, power amplifiers $320_0$-$320_{L-1}$ and antenna elements $322_0$-$322_{L-1}$.

As explained above, the typical approach of implementing CDM is to apply the unique codes in time domain. In a receiver scenario, the aggregated and code multiplexed signal fans out to L paths such that a unique code can be applied to demultiplexed each of the L antenna elements. Each path includes an intermediate processing step, which is generically defined to be some non-element specific processing. The signal is then sent to a subbanding channelizer, utilizing a polyphase filter and FFT circuit. The channelizer outputs all the subbands spanning the wideband frequency. In a transmitter scenario, L subbanded signals are first processed by a recombiner, utilizing an IFFT circuit followed by a polyphase filter. The result is sent to some non-element specific intermediate processing before applying the unique code to each of the L paths and aggregating the L paths back into a single combined waveform. However, using the conventional time domain approach becomes costly in hardware since each of the L paths has its own dedicated signal processing chain.

SUMMARY

In some embodiments, the disclosed invention is a system for efficient wideband code division multiplexing in subband domain. The system includes: a plurality of L low noise amplifiers for amplifying L analog signals received from L antenna elements, where L is an integer greater than 1; a summer for aggregating the L amplified signals into a single aggregated signal, by using code division multiplexing with L code words; a single analog-to-digital converter (ADC) for converting the single aggregated analog signal to a single aggregated digital signal; a single polyphase filter bank and a single fast Fourier transform (FFT) circuit to channelize the single aggregated digital signal into N subbands, where N is an integer greater than 1; a plurality of L circular convolution circuits to perform circular convolutions of the N subbands with the L code words to demultiplex the channelized signal into L elements per subband; and a routing matrix for routing each subband signal of the L elements to N beamforming circuits for performing beamforming on each of the N subbands.

In some embodiments, the disclosed invention is a method for efficient wideband code division multiplexing in subband domain. The method includes: aggregating L analog signals received from L antenna elements into a single aggregated signal, by using code division multiplexing with L code words, where L is an integer greater than 1; converting the single aggregated analog signal to a single aggregated digital signal, by a single analog-to-digital converter (ADC); channelizing the single aggregated digital signal into N subbands, where N is an integer greater than 1; performing circular convolutions of the N subbands with the L code words to demultiplex the channelized signal into L elements per subband; and routing each subband signal of the L elements to N beamforming circuits for performing beamforming on each of the N subbands.

In some embodiments, the code division multiplexing may be performed by a bi-phase modulator.

In some embodiments, the disclosed invention is a system for efficient wideband code division multiplexing in subband domain. The system includes: a plurality of N beamforming circuits for performing beamforming from N subband signals to be transmitted by L antenna elements, using L elements for each of the N subband signals, where L and N are integers greater than 1; a routing matrix for routing the N subband signals for each of the L elements; a plurality of L circular convolution circuits and a summer for code division multiplexing, in the subband domain, the signals for L antenna elements in each N subband to generate a single digital signal, wherein the routing matrix routes the N subband signals for each of the L elements to the L circular convolution circuits, a single inverse fast Fourier transform (IFFT) circuit and a single polyphase filter bank to combine the single digital signal into a wideband digital signal; a single digital-to-analog converter (DAC) to convert the single digital signal to a wideband analog signal; and a plurality of L code correlator circuits for demultiplexing the wideband analog signal to L analog signals, wherein the L antenna elements transmit the L analog signals.

In some embodiments, the disclosed invention is a method for efficient wideband code division multiplexing in subband domain. The method includes: performing beamforming from N subband signals to be transmitted by L antenna elements, using L elements for each of the N subband signals, where L and N are integers greater than 1; routing the N subband signals for each of the L elements for circular convolution; performing code division multiplexing, in the subband domain, the signals for L antenna elements in each N subband to generate a single digital signal, combining the single digital signal into a wideband digital signal; converting the single digital signal to a wideband analog signal; demultiplexing the wideband analog signal to L analog signals; and transmitting the L analog signals.

In some embodiments, the code division multiplexing may be performed utilizing Hadamard codes.

BRIEF DESCRIPTION OF THE DRAWINGS

These and other features, aspects, and advantages of the present invention will become better understood with regard to the following description, appended claims, and accompanying drawings.

FIG. 4 is an exemplary block diagram of a receiver with code division multiplexing (CDM), according to some embodiments of the disclosed invention.

FIG. 5 is an exemplary block diagram of a transmitter with code division multiplexing (CDM), according to some embodiments of the disclosed invention.

FIG. 6 is a simplified process flow diagram for generating subband domain coefficients used for code division multiplexing and demultiplexing (CDM) via circular convolution in subband domain in both receive and transmit modes, according to some embodiments of the disclosed invention.

FIG. 7 is a simplified process flow diagram for efficient wideband code division multiplexing in subband domain in a receive mode, according to some embodiments of the disclosed invention.

FIG. 8 is a simplified process flow diagram for efficient wideband code division multiplexing in subband domain in a transmit mode, according to some embodiments of the disclosed invention.

DETAILED DESCRIPTION

Figure 1:
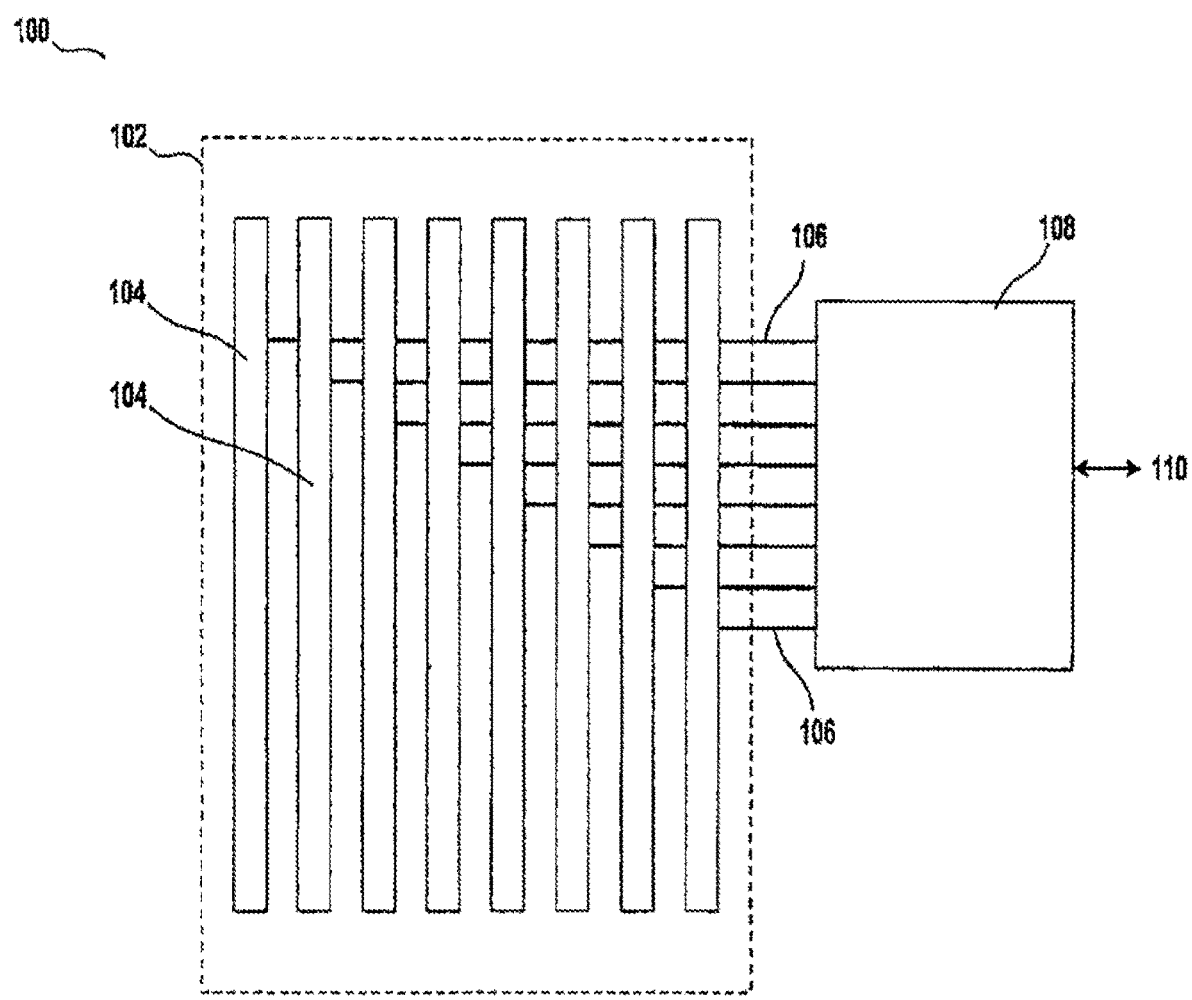
FIG. 1 shows a diagram of a known antenna array.
Figure 2:
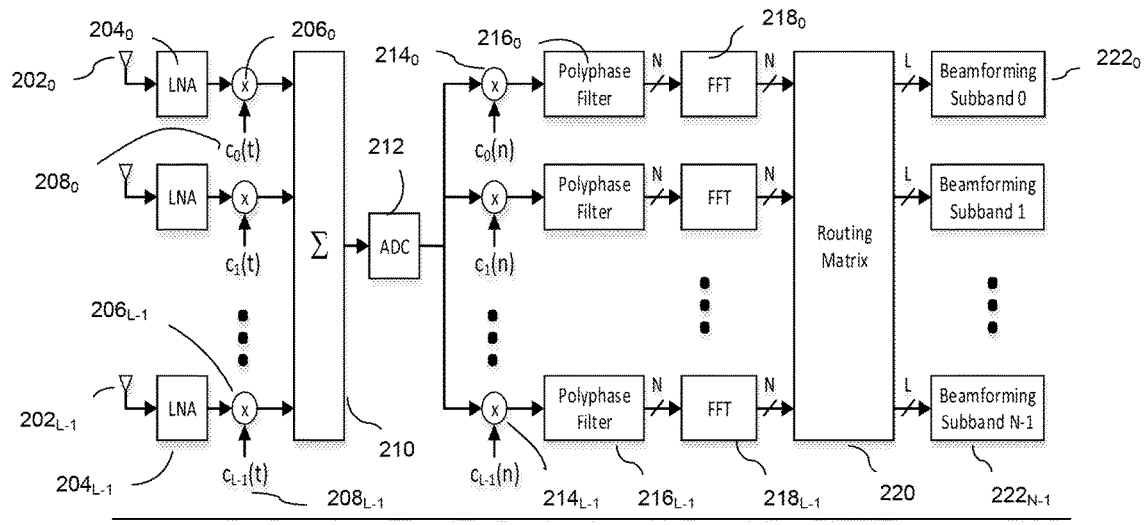
FIG. 2 is an exemplary block diagram of a conventional receiver with code division multiplexing (CDM).
Figure 3:
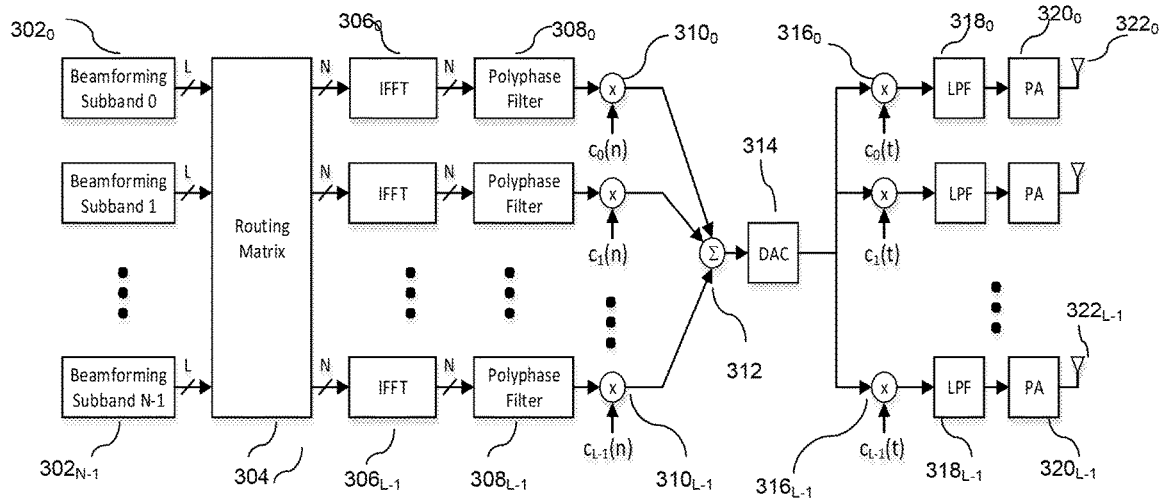
FIG. 3 is an exemplary block diagram of a conventional transmitter with code division multiplexing (CDM).

In some embodiments, the disclosed invention is a system and method for performing digital beam forming for large antenna arrays. In some embodiments, the disclosed invention utilizes code division multiplexing (CDM) to combine signals from an antenna array in the wideband domain before analog-to-digital conversion and subband processing. In a receive path, CDM enables multiple antenna elements to share a single analog-to-digital converter (ADC) and thus reducing the total number of ADCs and consumed power. In a transmit path, CDM enables multiple antenna elements to share a single digital-to-analog converter (DAC) and thus reducing the total number of DACs and consumed power. Moreover, CDM has a low-complexity analog hardware implementation (i.e. a bi-phase modulator) compared to other multiplexing schemes such as frequency division multiplexing (FDM).

In some embodiments, the disclosed invention uses a hardware efficient process to implement CDM in the wideband domain and code division multiplexing (and demultiplexing) in the subband domain. This implementation integrates the code application into the channelizer process and thus eliminating the need for a time-domain code correlator. This results in a lower complexity payload with less SWaP. It also significantly reduces scan loss as experienced in some of the conventional systems that combine elements into sub-arrays, prior to digital beamforming.

In some embodiments, signals received from a subset of antenna elements are orthogonally aggregated using CDM before being digitized and therefore reducing the number of required ADCs. The digitized signal of each antenna element is demultiplexed in the digital domain. Similarly, on the transmit path, a subset of digitized signals are code division multiplexed before being sent into a single DAC, and then demultiplexed in the analog domain. In some embodiments, an efficient algorithm is employed to reduce hardware complexity of the multiplexing/demultiplexing operations by using CDM in the subband domain.

FIG. 4 is an exemplary block diagram of a receiver with CDM, according to some embodiments of the disclosed invention. For simplicity reasons, only one of the like elements in different subbands is numbered in the figure. As shown, signals received on L antenna elements 402 are amplified by L low noise amplifiers (LNAs) 404 and aggregated by a summer 408 after code division multiplexing by a bi-phase modulator 406 before being digitized by an ADC 410, where L is also the number of code words and a rational multiple of N, that is L=P/Q*N, where P and Q are positive integers. The multiplication of $c_i(t)$ with the amplified signal can be implemented in hardware with the bi-phase modulator 406.

The aggregated signal is then channelized into N subbands using a single polyphase filter bank 412 and a single FFT circuit 414. Subsequently, L circular convolutions are performed across FFT output to demultiplex the channelized signal into L elements per subband, using L circular convolution circuits 416. It is known that multiplication in time domain translates to circular convolution in frequency domain. Therefore, to apply a code in the frequency domain, the circular convolution circuits 416 perform a circular convolution of the FFT output with the Fourier-series coefficients of the code. A routing matrix 418 routes the N subband signals in each L antenna element to N beamforming circuits 420. That is, the output of each circular convolution circuit 416 is N subbands for a particular antenna element. The routing matrix re-organizes these signals so that they are grouped by subband. As shown, there are L element signals per subband at the output of the routing matrix 418. The N beamforming circuits 420 perform partial or full beamforming using L elements for each subband. As shown, beamforming performed at the subband level mitigates wideband frequency dispersion.

As described above, in these embodiments, the disclosed invention performs the demultiplexing after wideband channelization (i.e., in subband domain), resulting in significantly lower hardware complexity. In some embodiments, the aggregate waveform is demultiplexed by computing a circular convolution of the subband samples with the frequency domain Fourier coefficients of the applied orthogonal code. It can be shown that the coefficients for most codes are sparse in frequency domain (e.g., many "0"s) and therefore require less hardware compared to processing each antenna element individually in the alternative time-domain implementation of demultiplexing prior to wideband channelization.

FIG. 5 is an exemplary block diagram of a transmitter with CDM, according to some embodiments of the disclosed invention. For simplicity reasons, only one of the like elements in different subbands is numbered in the figure. A plurality (N) subband signals are received to be transmitted by L antenna elements, each subband including L elements. As depicted, partial or full beamforming is performed using L elements for each subband by the N beamforming circuits 502. Beamforming is performed at the subband level to mitigate wideband frequency dispersion. A routing matrix 504 routes N subband signals to L circular convolution circuits 506. For each of the N subbands, signals for L elements are code division multiplexed in the subband domain using the circular convolution circuits 506 and are aggregated by a summer 508. Resulting multiplexed subbands are recombined into a wideband signal using an IFFT circuit 510 and a polyphase filter bank 512. The recombined signal is then converted to an analog signal by a single DAC 514 and demultiplexed using L code correlator circuits implemented with bi-phase modulators 516, before being sent to its respective element RF chain, including low pass filters 518, power amplifiers 520 and antenna elements 522. The multiplication of $c_i(t)$ with the analog signal can be implemented in hardware with a bi-phase modulator 516.

This way, the order of operations are switched to have demultiplexing (or multiplexing) performed in the subband domain after channelization (or prior to channelization, in the case of multiplexing), which is one of the subsequent steps in the processing chain prior to digital beamforming. That is, wideband code division multiplexing (WB-CDM) is performed without any further hardware complexity. This application of WB-CDM is different from the conventional approaches since continuous wideband signals are multiplexed as opposed to constant digital data symbols, as seen in the conventional spread spectrum techniques, such as DSSS-CDMA.

The process can be further optimized by selecting compatible numerologies (e.g., number of subbands, samples per chip, code length, etc.) and exploiting symmetry properties of the code. Furthermore, by switching the order of operations, the waveforms can be processes in batch while they are still multiplexed. For example, in the receive scenario, the code application is commuted such that it is performed after the intermediate processing and channelization. Similarly, in the transmit case, the code application is performed before any intermediate processing and recombining. This way, the amount of hardware is effectively reduced by condensing L paths into a single path and thus the hardware required for intermediate processing and channelization is reduced by a factor of L.

FIG. 6 is a simplified process flow diagram for generating subband domain coefficients used for code division multiplexing and demultiplexing (CDM) via circular convolution in subband domain in both receive and transmit modes, according to some embodiments of the disclosed invention. In some embodiments, the coefficients are generated offline and are hard-coded or configured by the user. As shown in block 602, a set of time-domain orthogonal codes, for example, Hadamard codes, are initially selected. In block 604, the selected set of codes is sampled at a frequency of at least L times the signal bandwidth to prevent image aliasing. In block 606, a numerology (e.g., number of subbands, samples per chip, code length, etc.) is selected such that the number of samples within each code sequence is a rational multiple of the FFT size N, where N is also the number of subbands. That is, L=P/Q*N, where P and Q are both positive integers. In block 608, the discrete sequence of each code is repeated Q times and segmented into P sets of N samples. In block 610, the FFT of each set of codes is taken to obtain the subband domain coefficients for that particular code. The set of subband domain coefficients for a code are sequentially convolved with the subband data to apply the code in frequency domain, in block 612.

FIG. 7 is a simplified process flow diagram for efficient wideband code division multiplexing in subband domain in a receive mode, according to some embodiments of the disclosed invention. As shown in block 702, L analog signals received from L antenna elements are aggregated into a single aggregated signal, by using code division multiplexing with L code words, where L is an integer greater than 1. The aggregation may be performed by, for example, a summer, such as summer 408 in FIG. 4. In block 704, the single aggregated analog signal is converted to a single aggregated digital signal, by a single ADC, such as ADC 410, in FIG. 4. In block 706, the single aggregated digital signal is channelized into N subbands, where N is an integer greater than 1, for example, by the single polyphase filter bank 412 and the single FFT circuit 414, in FIG. 4

A circular convolutions of the N subbands with the L code words is performed in block 708 to demultiplex the channelized signal into L elements per subband, for example, by the plurality of L circular convolution circuits 416 in FIG. 4. In block 710, each subband signal of the L elements is routed to N beamforming circuits for performing beamforming on each of the N subbands, for example, by the routing matrix 418, in FIG. 4. In optional block 712, partial or full beamforming is performed using L elements for each subband.

FIG. 8 is a simplified process flow diagram for efficient wideband code division multiplexing in subband domain in a transmit mode, according to some embodiments of the disclosed invention. As depicted in block 802, beamforming from N subband signals to be transmitted by L antenna elements is performed, using L elements for each of the N subband signals, where L and N are integers greater than 1. The N subband signals may be output of a radar, sensor or communication array. In block 804, the N subband signals for each of the L elements are routed for circular convolution, for example, by a matrix router 504, in FIG. 5. Code division multiplexing, in the subband domain, is then performed on the signals for L antenna elements in each N subband to generate a single digital signal, in block 806. This may be performed by the L circular convolution circuits 506 and the summer 508, in FIG. 5.

In block 808, the single digital signal is combined into a wideband digital signal, for example, by the IFFT circuit 510 and the polyphase filter bank 512, in FIG. 5. The single digital signal is then converted to a wideband analog signal, in block 810 and the wideband analog signal is demultiplexed to L analog signals, in block 812. The demultiplexing may be accomplished by the L code correlator circuits 516, in FIG. 5. The L analog signals are then transmitted by the antenna elements, in block 814.

It will be recognized by those skilled in the art that various modifications may be made to the illustrated and other embodiments of the invention described above, without departing from the broad inventive step thereof. It will be understood therefore that the invention is not limited to the particular embodiments or arrangements disclosed, but is rather intended to cover any changes, adaptations or modifications which are within the scope of the invention as defined by the appended drawings and claims.

The invention claimed is:

1. A system for efficient wideband code division multiplexing in subband domain comprising:
   a plurality of L low noise amplifiers for amplifying L analog signals received from L antenna elements, where L is an integer greater than 1;
   a summer for aggregating the L amplified analog signals into a single aggregated analog signal, by using code division multiplexing with L code words;
   a single analog-to-digital converter (ADC) for converting the single aggregated analog signal to a single aggregated digital signal;
   a single polyphase filter bank and a single fast Fourier transform (FFT) circuit to channelize the single aggregated digital signal into N subbands, where N is an integer greater than 1;
   a plurality of L circular convolution circuits to perform circular convolutions of the N subbands with the L code words to demultiplex the channelized signal into L elements per subband; and
   a routing matrix for routing each subband signal of the L elements to N beamforming circuits for performing beamforming on each of the N subbands.

2. The system of claim 1, wherein the code division multiplexing is performed by a bi-phase modulator.

3. The system of claim 1, wherein the code division multiplexing is performed utilizing Hammard codes.

4. The system of claim 1, wherein the circular convolutions of the N subbands with the L code words is performed by performing a circular convolution of an output of the FFT circuit with the Fourier-series coefficients of the code words.

5. The system of claim 1, wherein an output of each circular convolution circuit includes N subbands for a particular antenna element.

6. The system of claim 5, wherein the routing matrix re-organizes the output of each circular convolution circuit to group them by subband.

7. The system of claim 5, wherein there are L element signals per subband at an output of the routing matrix.

8. The system of claim 5, wherein the N beamforming circuits perform partial or full beamforming using L elements for each subband.

9. A method for efficient wideband code division multiplexing in subband domain, the method comprising:
- aggregating L analog signals received from L antenna elements into a single aggregated analog signal, by using code division multiplexing with L code words, where L is an integer greater than 1;
- converting the single aggregated analog signal to a single aggregated digital signal, by a single analog-to-digital converter (ADC);
- channelizing the single aggregated digital signal into N subbands, where N is an integer greater than 1;
- performing circular convolutions of the N subbands with the L code words to demultiplex the channelized signal into L elements per subband; and
- routing each subband signal of the L elements to N beamforming circuits for performing beamforming on each of the N subbands.

10. The method of claim 9, wherein the code division multiplexing is performed utilizing Hammard codes.

11. The method of claim 9, wherein the code division multiplexing (CDM) further comprises generating subband domain coefficient for the CDM by:
- selecting a set of time-domain orthogonal codes;
- sampling the selected set of orthogonal codes at a frequency of at least L times a signal bandwidth to prevent image aliasing;
- selecting a numerology such that number of samples within each orthogonal code sequence is a rational multiple of N, wherein $L=P/Q*N$, where P and Q are both positive integers;
- repeating discrete sequence of each orthogonal code Q times and segmenting the sequence into P sets of N samples;
- performing fast Fourier transform (FFT) on each orthogonal code to obtain the subband domain coefficients for said each orthogonal code; and
- sequentially convolving the set of subband domain coefficients for an orthogonal code with subband data to apply the orthogonal code in frequency domain.

12. A system for efficient wideband code division multiplexing in subband domain comprising:
- a plurality of N beamforming circuits for performing beamforming from N subband signals to be transmitted by L antenna elements, using L elements for each of the N subband signals, where L and N are integers greater than 1;
- a routing matrix for routing the N subband signals for each of the L elements;
- a plurality of L circular convolution circuits and a summer for code division multiplexing, in the subband domain, the signals for L antenna elements in each N subband to generate a single digital signal, wherein the routing matrix routes the N subband signals for each of the L elements to the L circular convolution circuits;
- a single inverse fast Fourier transform (IFFT) circuit and a single polyphase filter bank to combine the single digital signal into a wideband digital signal;
- a single digital-to-analog converter (DAC) to convert the single digital signal to a wideband analog signal; and
- a plurality of L code correlator circuits for demultiplexing the wideband analog signal to L analog signals, wherein the L antenna elements transmit the L analog signals.

13. The system of claim 12, wherein the code division multiplexing is performed utilizing Hammard codes.

14. The system of claim 12, wherein an output of the DAC is demultiplexed using L code correlator circuits.

15. The system of claim 12, further comprising a plurality of low pass filters for filtering the L analog signals, respectively.

16. The system of claim 15, further comprising a plurality of power amplifiers for amplifying outputs of the plurality of low pass filters, respectively.

17. A method for efficient wideband code division multiplexing in subband domain, the method comprising:
- performing beamforming from N subband signals to be transmitted by L antenna elements, using L elements for each of the N subband signals, where L and N are integers greater than 1;
- routing the N subband signals for each of the L elements for circular convolution;
- performing code division multiplexing, in the subband domain, the signals for L antenna elements in each N subband to generate a single digital signal;
- combining the single digital signal into a wideband digital signal;
- converting the single digital signal to a wideband analog signal;
- demultiplexing the wideband analog signal to L analog signals; and
- transmitting the L analog signals.

18. The method of claim 17, wherein the code division multiplexing is performed utilizing Hammard codes.

19. The method of claim 18, wherein the code division multiplexing (CDM) further comprises generating subband domain coefficient for the CDM by:
- selecting a set of time-domain orthogonal codes;
- sampling the selected set of orthogonal codes at a frequency of at least L times a signal bandwidth to prevent image aliasing;
- selecting a numerology such that number of samples within each orthogonal code sequence is a rational multiple of N, wherein $L=P/Q*N$, where P and Q are both positive integers;
- repeating discrete sequence of each orthogonal code Q times and segmenting the sequence into P sets of N samples;
- performing fast Fourier transform (FFT) on each orthogonal code to obtain the subband domain coefficients for said each orthogonal code; and
- sequentially convolving the set of subband domain coefficients for an orthogonal code with subband data to apply the orthogonal code in frequency domain.

20. The method of claim 19, wherein the time-domain orthogonal codes are Hammard codes.

* * * * *